United States Patent [19]

Castritis

[11] Patent Number: 5,265,721
[45] Date of Patent: Nov. 30, 1993

[54] EJECTABLE COMPACT DISC CONTAINER

[76] Inventor: Tryfon D. Castritis, 3076 Chestnut Ave., Long Beach, Calif. 90806

[21] Appl. No.: 736,140

[22] Filed: Jul. 26, 1991

[51] Int. Cl.⁵ .............................................. B65D 85/57
[52] U.S. Cl. .................................... 206/309; 206/313
[58] Field of Search ............... 206/307, 309, 310, 311, 206/312, 313, 444; 312/10, 12, 15, 18, 19; 220/93, 343

[56] References Cited

U.S. PATENT DOCUMENTS

| | | | |
|---|---|---|---|
| 3,730,602 | 5/1973 | Campbell et al. | 206/309 X |
| 4,108,511 | 8/1978 | Spragg, Jr. | 312/15 X |
| 4,697,704 | 10/1987 | Curry | 206/444 |
| 4,728,157 | 3/1988 | David, Jr. | 312/12 |
| 4,747,484 | 5/1988 | Ackeret | 206/309 X |
| 4,760,502 | 7/1988 | Ackeret | 206/311 X |
| 4,964,510 | 10/1990 | Loyd | 206/312 X |
| 4,976,350 | 12/1990 | Fukumoto | 312/15 X |
| 5,000,316 | 3/1991 | Lerner | 206/309 |
| 5,011,010 | 4/1991 | Francis et al. | 206/313 X |
| 5,038,932 | 8/1991 | Sheu | 312/12 X |
| 5,088,599 | 2/1992 | Mahler | 206/313 |

*Primary Examiner*—Jimmy G. Foster
*Assistant Examiner*—Jacob K. Ackun, Jr.
*Attorney, Agent, or Firm*—Poms, Smith, Lande & Rose

[57] ABSTRACT

A compact disc container that allows the user to open the container and insert the disc into a compact disc container using only one hand is disclosed. The container includes a tray that holds the compact disc, and slides along two ridges in the container between a retracted position and an extended position. The user controls the sliding of the tray by sliding a knob mounted on the tray and protruding through the cover of the container. When the container is opened along one wall of the container, the tray is slid out of the container to its extended position so as to enable removal of the compact disc.

21 Claims, 3 Drawing Sheets

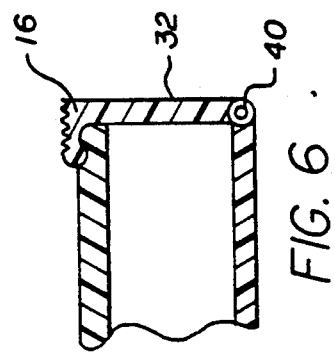
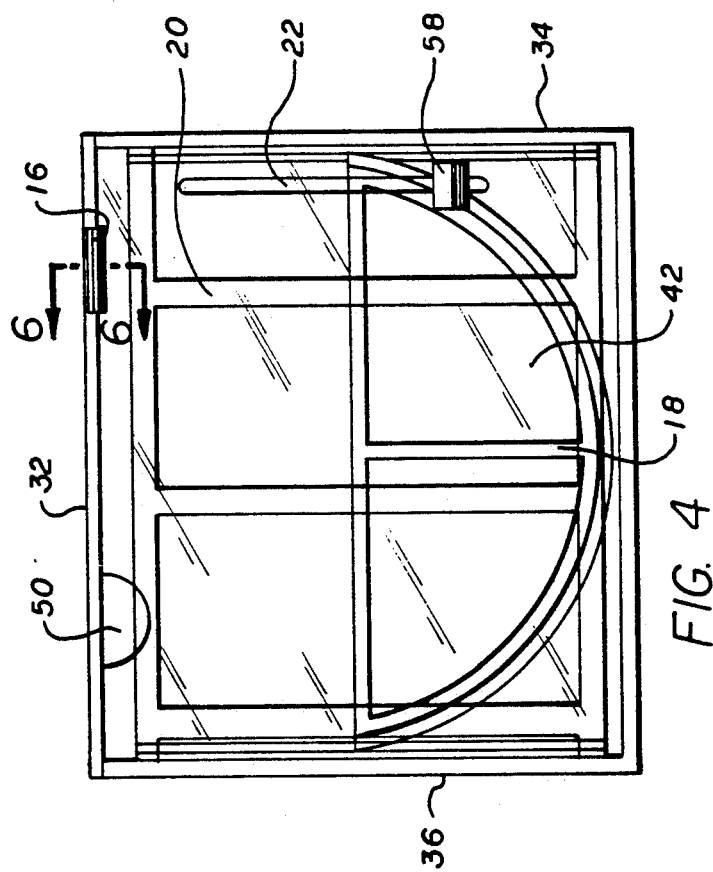
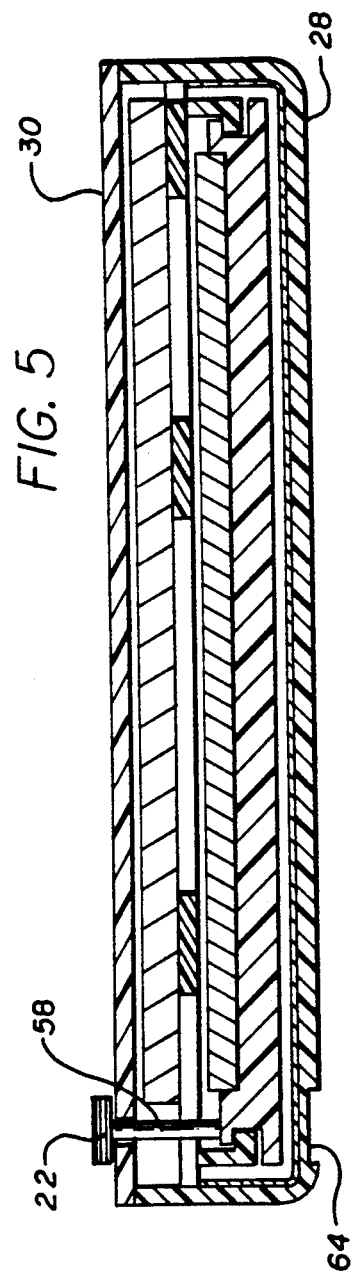

EJECTABLE COMPACT DISC CONTAINER

I. FIELD OF INVENTION

This invention relates to containers for compact discs and more particularly to containers for compact discs that enable the user to open the container and eject the disc using only one hand.

II. BACKGROUND OF INVENTION

Within the past few years, automobile owners have increasingly opted to either replace tape players with compact disc players, or else to purchase new automobiles with compact disc players. This choice is primarily due to the high quality output and relatively small size of compact disc players. However, automobile compact disc player owners are facing a problem that did not arise with tapes. This problem is rooted in the fact that compact discs are stored in plastic boxes in order to prevent scratching or breaking of the disc. Unlike audio tapes, compact discs cannot be stored in the cars outside of their cases. Therefore, the automobile compact disc player owner must be able to remove and replace the compact disc from the case while driving. This problem is exacerbated by the fact that the compact disc containers commonly used today are very difficult to open, and even more difficult, if not impossible, to open with only one hand. Moreover, once the case is opened, the user again requires two hands to remove the disc from the locking piece within the case.

Therefore, a need clearly exists for a compact disc container that enables the user to open the container and remove the disc with only one hand, thereby not significantly impairing the concentration of the driver.

In standard compact disc containers, the user is also required to manually remove the compact disc from the container and insert it into the compact disc player. This step often results in the user dropping and/or damaging the disc. Therefore, a need also exists for a compact disc container that enables the user to insert the compact disc into the compact disc player without handling the compact disc.

The typical compact disc container also utilizes an unnecessarily large amount of plastic material to store the compact disc and paper booklet label. The typical compact disc container uses two separate full-sized plastic trays within the container to hold the compact disc and the booklet. The amount of plastic used is not only wasteful, but also creates unnecessary costs in the manufacturing process and in shipping. Therefore, a need also exists for a compact disc container that minimized the amount of plastic used in each case.

III. SUMMARY OF INVENTION

Accordingly, one object of the present invention is to provide a compact disc container from which the compact disc may be removed with one hand.

Another object of the invention is to provide a compact disc container that may be opened with only one hand.

Another object of the present invention is to provide a compact disc container that enables the user to load the compact disc into the compact disc player without handling the compact disc.

A still further object of the invention is to provide a compact disc container that is inexpensive to manufacture.

Yet another object of this invention is to provide a compact disc container that minimizes the amount of plastic used in the container.

These and other objects of the present invention are achieved through an ejectable compact disc container that comprises a substantially rigid box having a base portion, a cover portion, a front wall, a rear wall, a right wall, and a left wall, hinges allowing the front wall to pivot from an open position to a closed position; a tray portion for supporting the compact disc; a booklet support portion for supporting the booklet/label; and means for sliding the tray from a retracted position to an extended position, wherein a portion of the compact disc protrudes beyond the front wall when the tray is in the extended position. The sliding means is designed to allow the user to hold the container and slide the tray from the retracted position to the extended position with one hand.

These and other objects of the present invention will now become apparent from a review of the drawings and the following description of the preferred embodiments.

IV. BRIEF DESCRIPTION OF THE DRAWINGS

FIG. 4 is a top view of the compact disc container.

FIG. 5 is a side cross-sectional view of the container taken along line 5—5 of FIG. 1.

FIG. 6 is a an enlarged view of the locking means of the front wall of the container taken along line 6—6 of FIG. 4.

V. DETAILED DESCRIPTION

Figure 1:
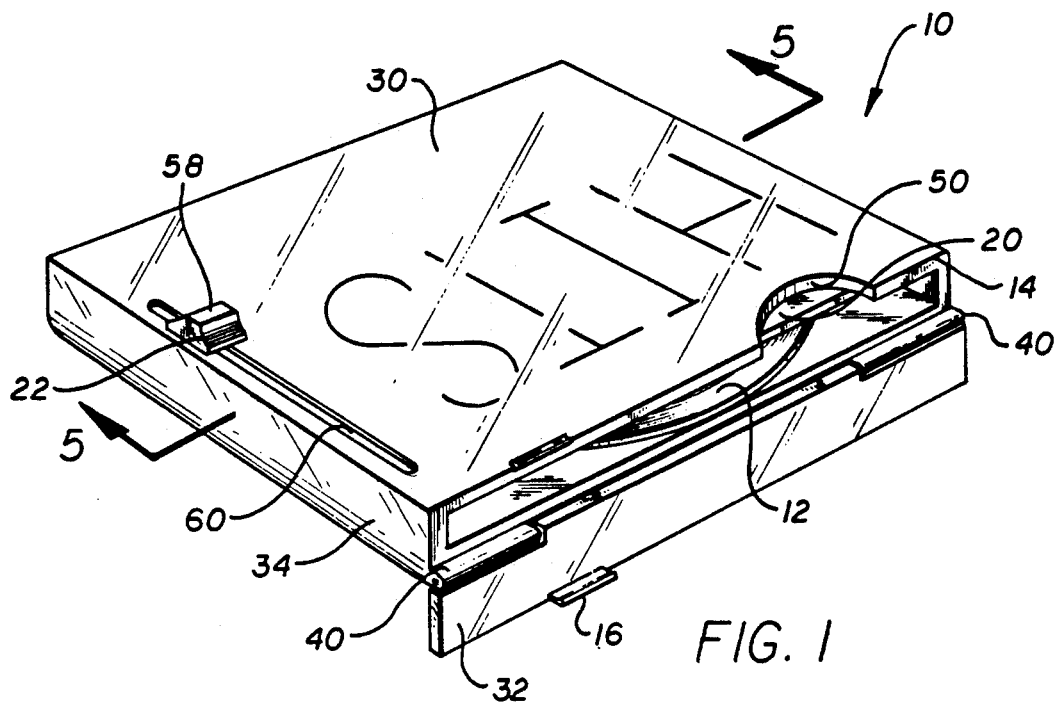
FIG. 1 is a perspective view of the ejectable compact disc container.
Figure 2:
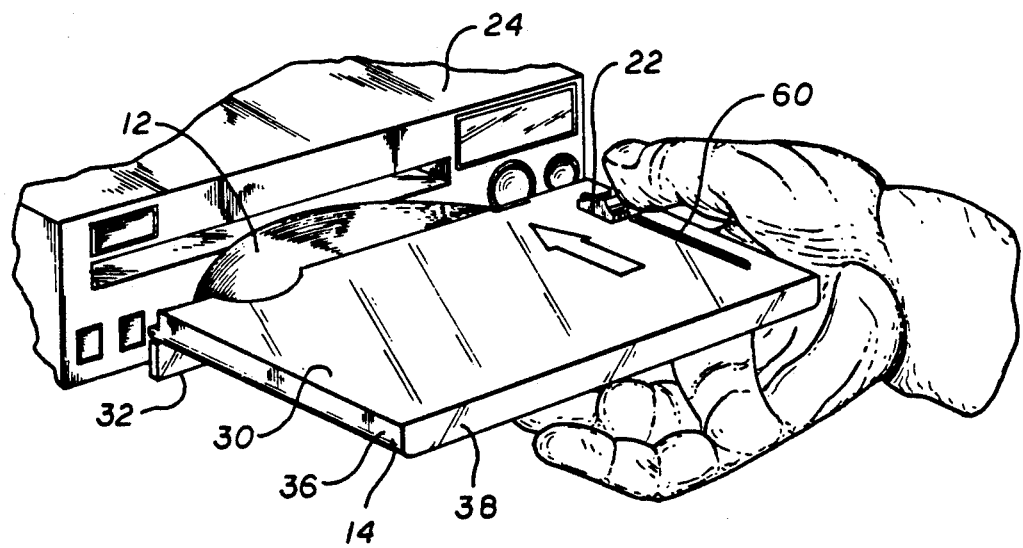
FIG. 2 is a perspective view of the ejectable compact disc container with the compact disc being inserted into the compact disc player.

Referring first to FIGS. 1 and 2, the ejectable container 10 for a compact disc 12 is shown in perspective view. The container 10 is comprised of a substantially rigid box 14, a container locking means 16, a compact disc tray portion 18 for supporting the compact disc within the box 14, a paper label booklet support portion 20, and a tray sliding means 22. As shown in FIG. 2, the container 10 is designed to allow a user to open the container 10 and eject the compact disc 12 while using only one hand. When the compact disc is in its ejected position, the compact disc player 24 grasps the compact disc 12, thereby eliminating the need for the driver to handle the compact disc 12. The preferred embodiment of the container 10 is designed to allow use with the right hand since this hand is more accessible to automobile compact disc players 24. However, if desired, the container 10 is easily adapted so as to enable use with the left hand.

Figure 3:
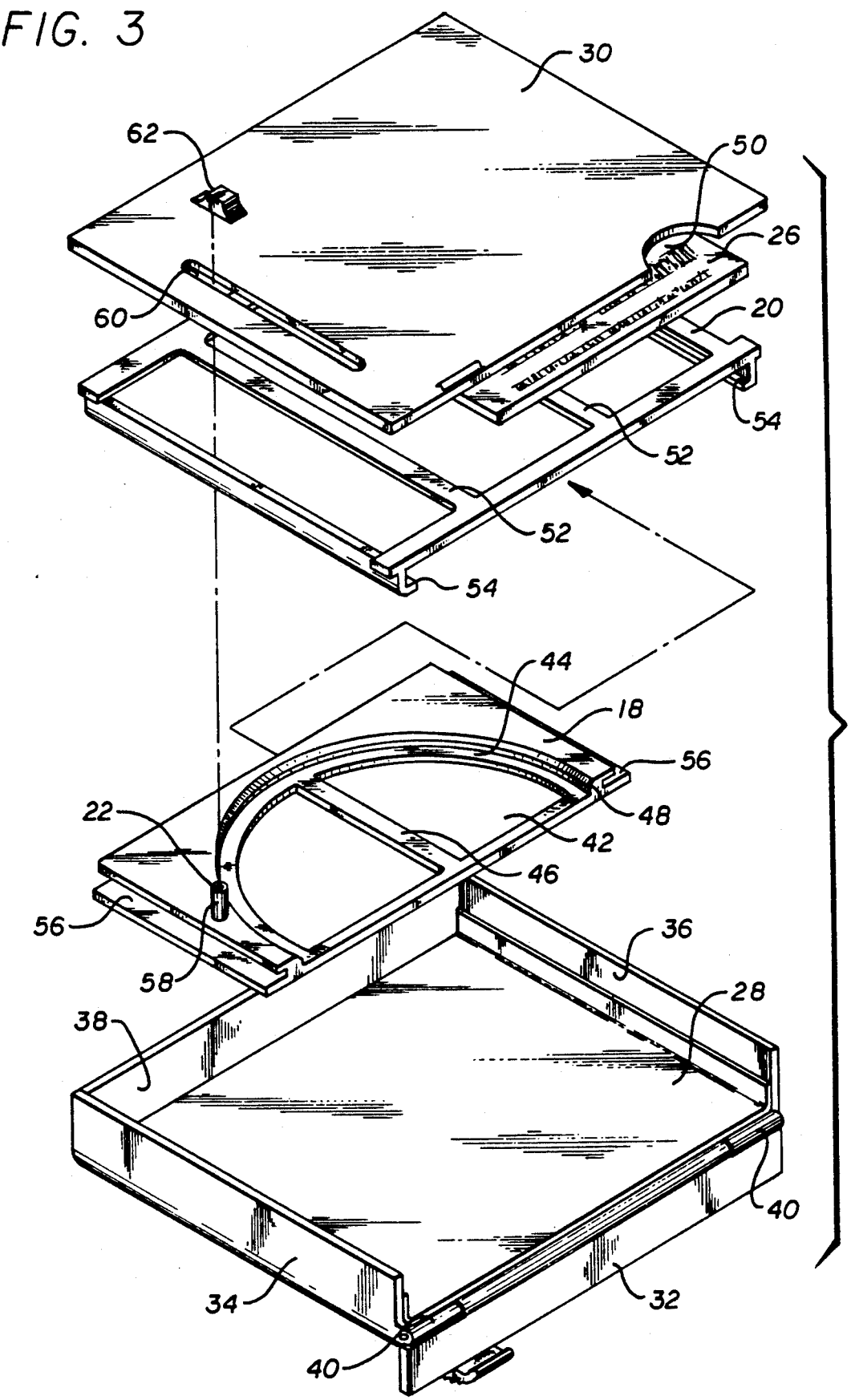
FIG. 3 is an exploded view of the compact disc container.

Referring now to FIGS. 3 and 4, the preferred construction of the container 10 is described in detail. The box 14 comprises a base portion 28, a cover portion 30, a front wall 32, a right wall 34, a left wall 36, and a rear wall 38. In the preferred embodiment, the front wall 32 is hinged to the base portion 28 with a plurality of hinges 40 so as allow the front wall 32 to pivot from an open position to a closed position. In the open position, the front wall 32 extends downward, perpendicular to the base portion 28 of the box 14. In the closed position, the front wall 32 is secured by a the container locking means 16. The locking means 16 is preferably located near the right wall 34 of the box 14 so that the user can open and close the front wall 32 with his right thumb while holding the container 10 in his right hand. One embodiment of the locking means 16 is shown in detail in FIG. 6.

The box 14 further contains the compact disc tray portion 18. In the preferred embodiment, the tray portion 18 is dimensioned so as to have a length equal to half the length of the base portion 28 as measured from the front wall 32 to the rear wall 38. The tray portion 20 is formed with a semi-circular cavity 42, which a portion of the compact disc 12 engages during storage. For purposes of conserving plastic, the semi-circular cavity 42 does not require a full sheet of plastic in the cavity, instead a rim portion 44 and a central support portion 46 are sufficient to support the compact disc 12. As an additional feature, the cavity 42 may include a lip 48 formed on the upper edge of the cavity 42. The lip 48 provides upper support for the compact disc 12, thereby preventing undesired movement of the compact disc 12 within the container 10.

FIG. 3 shows the booklet support portion 20 in detail. In the preferred embodiment the booklet support portion 20 is mounted adjacent the cover portion 30, so as to enable the insertion of the booklet 26 between the booklet support portion 20 and the cover portion 30, as well as enabling the user to view the booklet 26 through the cover portion 30. The cover portion 30 also includes a notch 50 formed in the area of the cover portion 30 adjacent the front wall 32. The notch 50 facilitates insertion and removal of the booklet 26.

Similar to the semi-circular tray cavity 42, the booklet support portion 20 does not require a full sheet of plastic. Instead, as shown in FIG. 3, the booklet support portion 20 is comprised of a plurality of booklet support members 52 that provide support to the booklet 26 in only the necessary areas.

In the embodiment shown in FIGS. 3 and 4, the booklet support portion 20 defines two ridges 54 that extend along the length of the right wall 34 and the left wall 36. In an alternative embodiment, the ridges 54 may be formed separate from the booklet support portion 20. Thus by way of example, but not of limitation, the ridges 54 may be formed on the right wall 34 and the left wall 36 of the box 14. The tray portion 18 includes two sliding channels 56 extending along the length of the right edge and the left edge of the tray portion 18. The sliding channels 56 are designed to allow the ridges 54 to slidably engage with the channels 56. The tray portion 18 further includes a knob 58 formed on the upper surface of the tray portion 18. The knob 58 is preferably located in the right, rear area of the tray portion 18, and is used to push the tray portion 18 along the ridges 54. In the embodiment shown, the knob 58 protrudes through the booklet support portion 20 and a slot 60 formed in the cover portion 30. The slot 60 is dimensioned such that the tray portion 18 is in a fully retracted position when the knob 58 is at the position in the slot 60 nearest the rear wall 38, and the tray portion 18 is in its fully extended position when the knob 58 is in a position in the slot 60 nearest the front wall 32. Therefore, the dimensions of the slot 60 prevent the user from sliding the tray portion 18 completely out of the box 14. In the preferred embodiment, the slot 60 is of a minimal width so as to prevent dust and foreign particles from entering the container 10.

In an alternative embodiment, the knob 58 may include a friction portion 62 to increase the grip of the knob 58 by the user. In the preferred embodiment, the portion of the knob 58 extending above the cover portion 30 is designed in a substantially triangular shape, so as to reduce the likelihood of breakage of the knob 58. Also in the preferred embodiment, the lower surface of the base portion 28 is formed with a stacking groove 64. The stacking groove 64 corresponds to the slot 60 formed in the cover portion 30, and has a depth equal to the height of the portion of the knob 58 protruding above the cover portion 30. The stacking groove 64 enables several ejectable compact disc containers 10 to be stacked in a stable position. Alternatively, the stacking groove 64 may consist of an aperture in the lower surface of the base portion 28 that corresponds to the area of the slot 60 in which the knob 58 is located when the compact disc tray portion 18 is in its fully retracted position. The aperture also has a depth equal to the height of the portion of the knob 58 protruding above the cover portion 30.

To more clearly illustrate the invention, the method of use of the ejectable compact disc container 10 will now be described in detail. The user of the container 10 first grasps the compact disc container 10 in close proximity to the right wall 34 of the container 10, with the front wall 32 of the container 10 facing the compact disc player 24. Using his thumb or forefinger, the user unlocks the front wall 32 from the cover portion 30. The front wall 30 will then pivot downward 180 degrees, so as to not obstruct the opening of the container 10. Using his thumb, the user next slides the knob 58 to the position in the slot 60 nearest the front wall 32, as shown in FIG. 2. The tray portion 18 is now in its fully extended position, yet the compact disc 12 is not extended far enough so as to fall out of the container 10. The user then holds the container 10 adjacent to the compact disc player 24 so as to enable the compact disc player 24 to grasp the compact disc 12, and remove it from the tray portion 18. The user then slides the knob 56 back to the position in the slot 60 nearest the rear wall 38, and closes the front wall 32. Therefore, using only one hand, and without touching the compact disc, the compact disc container has been opened, the compact disc removed and the container closed.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, the tray portion and booklet support portions may be designed with different dimensions. Also, the container may be adapted for use with other types of discs, for example laser discs. Accordingly, it is to be understood that the present invention is not limited to the precise construction as shown in the drawings and described hereinabove.

I claim:

1. An ejectable portable hand held container for storing a compact disc therein comprising:

a substantially rigid box comprising a base portion, a cover portion, a front wall, a rear wall, a right wall, and a left wall;

hinging means associated with the front wall and either said base portion or cover portion for hinging the front wall to a selected one of the base portion and the cover portion such that the front wall can change in configuration from an open position to a closed position;

a tray portion disposed in a parallel relationship between the base portion and the cover portion, the tray having a right edge corresponding to the right wall, a left edge corresponding to the left wall, and a rear edge corresponding to the rear wall, said tray portion having a cavity therein conforming to said compact disc adapted to receive at least a portion of said compact disc therein;

a booklet support portion disposed in a parallel relationship between the base portion and the cover portion; and sliding means for sliding the tray portion from a retracted position within said box to an extended position extending out of said box wherein a portion of the compact disc protrudes beyond the front wall when the tray portion is in the extended position.

2. An ejectable container for a compact disc in accordance with claim 1 wherein said sliding means further comprises:

a plurality of channels formed along the left edge and the right edge of the tray portion;

a plurality of ridges extending inside the box along the right wall and left wall, wherein the ridges fit within the channel so as support the tray portion within the box;

a knob formed on the tray portion in close proximity to both the right edge and the rear edge of the tray portion; and a slot formed in the cover portion, the slot being in close proximity to the right wall of the box, wherein the knob protrudes through and slides within the slot such that the tray portion is in a fully retracted position when the knob is in the position in the slot nearest the rear wall, and the tray portion is in a fully extended position when the knob is in the position in the slot nearest the front wall.

3. An ejectable container for a compact disc in accordance with claim 1 wherein said sliding means is located in close proximity to the right wall of the box.

4. An ejectable container for a compact disc in accordance with claim 1 wherein said cavity is a semi-circular cavity on the upper surface of said tray portion which at least a portion of the compact disc engages during storage.

5. An ejectable container for a compact disc in accordance with claim 4 wherein the semi-circular cavity further includes a lip formed along the upper edge of the cavity.

6. An ejectable container for a compact disc in accordance with claim 1 wherein the box further includes means for locking the front wall in a closed position.

7. An ejectable container for a compact disc in accordance with claim 6 wherein the front wall locking means is in close proximity to the right wall of the box.

8. An ejectable container for a compact disc in accordance with claim 1 wherein the booklet support portion is disposed between the cover portion and the tray portion, such that the booklet is supported between the cover portion and the booklet support portion.

9. An ejectable container for a compact disc in accordance with claim 8 wherein the cover portion further defines a notch cut into an area of the cover portion adjacent the front wall.

10. An ejectable container for a compact disc in accordance with claim I wherein the base portion further defines a stacking channel in the lower surface of the base portion corresponding to the slot in the cover portion, wherein the stacking channel is of a sufficient depth to allow the full height of the knob extending above the cover portion to fit into the channel when several containers are stacked.

11. An ejectable portable hand held container for storing a compact disc comprising:

a substantially rigid box having a base portion, a cover portion, a front wall, a rear wall, a right wall, and a left wall;

hinging means for hinging the front wall to a selected one of the base portion or cover portion, so as to enable the front wall to change in configuration from a closed position to an open position;

a tray disposed in a parallel relationship between the base portion and the cover portion, the tray having a right edge corresponding to the right wall, a left edge corresponding to the left wall, and a rear edge corresponding to the rear wall, said tray having a cavity therein conforming to said compact disc and adapted to receive at least a portion of said compact disc therein; and sliding means associated with said tray and said box for sliding the tray from a retracted position within said box to an extended position extending out of said box.

12. An ejectable container for a compact disc in accordance with claim 11 wherein the sliding means further comprises:

a plurality of channels formed along the left edge and the right edge of the tray;

a plurality of ridges extending inside the box along the right wall and left wall, wherein the ridges fit within the channels so as support the tray within the box;

a knob formed on the tray in close proximity to both the right edge and the rear edge of the tray; and a slot formed in the cover portion, the slot being in close proximity to the right wall of the box, wherein the knob fits and slides within the slot such that the tray is in a fully retracted position when the knob is in the position in the slot nearest the rear wall, and the tray is in a fully extended position when the knob is in the position in the slot nearest the front wall.

13. An ejectable container for a compact disc in accordance with claim 11 wherein the sliding means is located in close proximity to the right wall of the box.

14. An ejectable container for a compact disc in accordance with claim 1 wherein said cavity is a semi-circular cavity on the upper surface of said tray which at least a portion of the compact disc engages during storage.

15. An ejectable container for a compact disc in accordance with claim 14 wherein the semi-circular cavity further includes a lip formed along the upper edge of the cavity.

16. An ejectable container for a compact disc in accordance with claim 11 wherein the box further includes means for locking the front wall in a closed position.

17. An ejectable container for a compact disc in accordance with claim 16 wherein the front wall locking means is in close proximity to the right wall of the box.

18. An ejectable container for a compact disc in accordance with claim 11 wherein the base portion further defines a channel in the lower surface of the base portion corresponding to the slot in the cover portion, wherein he channel is of a sufficient depth to allow the portion of the knob extending above the cover portion to fit into the channel when several container are stacked.

19. An ejectable container for a compact disc comprising:
    a substantially rigid box having a base portion, a cover portion, a right wall, a left wall, and a rear wall;
    a tray portion disposed within the box in parallel relationship to the base portion and cover portion, the tray having a left edge corresponding to he left wall, a right edge corresponding to the right wall, and a rear edge corresponding to the rear wall;
    a plurality of channels formed along the left edge and the right edge of the tray;
    a plurality of ridges extending inside the box along the right wall and left wall, wherein the ridges are slidably engaged into the channels;
    an upwardly extending member formed on the upper surface of the tray; and
    a slot formed in the cover portion, wherein the upwardly extending member extends through the slot so as to protrude above the cover portion of the box, and further wherein the tray is in a fully retracted position when the tray is slid such that the member is in the position in the slot nearest the rear wall, and the tray is in a fully extended position when the tray is slid such that the member is in the position in the slot furthest from the rear wall.

20. An ejectable container for a compact disc in accordance with claim 19 further comprising means of supporting a booklet adjacent a selected one of the cover portion and the base portion of the box.

21. An ejectable container for a compact disc comprising:
    a substantially rigid box having a base portion, a cover portion, a right wall, a left wall, and a rear wall;
    a tray portion disposed within the box in parallel relationship to the base portion and cover portion, said tray portion having a cavity therein conforming to said compact disc and adapted to receive at least a portion of said compact disc therein, the tray portion having a left edge corresponding to the left wall, a right edge corresponding to the right wall, and a rear edge corresponding to the rear wall;
    cooperating means on said tray and said box enabling said tray to be slidable with respect to said box from a fully retracted position within said box to a fully extended position partially extend the compact disc out of said box;
    a protruding member extending from the upper surface of the tray; and
    a slot formed in the cover portion and bounded on all sides of said slot by said cover portion, wherein the protruding member extends through the slot so as to protrude above the cover portion of the box, and further wherein the tray is in a fully retracted position when the tray is slid such that the member is in the position in the slot nearest the rear wall, and the tray is in a fully extended position when the tray is slid such that the member is in the position in the slot furthest from the rear wall.

* * * * *